United States Patent
Hutchinson

(10) Patent No.: US 10,509,893 B2
(45) Date of Patent: Dec. 17, 2019

(54) METHOD FOR AUTHENTICATING A USER AND CORRESPONDING USER DEVICES, SERVER AND SYSTEM

(71) Applicant: GEMALTO INC, Austin, TX (US)

(72) Inventor: Michael Hutchinson, Cedar Park, TX (US)

(73) Assignee: THALES DIS FRANCE SA, Meudon (FR)

( * ) Notice: Subject to any disclaimer, the term of this patent is extended or adjusted under 35 U.S.C. 154(b) by 210 days.

(21) Appl. No.: 15/678,957

(22) Filed: Aug. 16, 2017

(65) Prior Publication Data
US 2019/0057199 A1 Feb. 21, 2019

(51) Int. Cl.
*G06F 21/31* (2013.01)
*H04L 9/32* (2006.01)
*H04W 12/06* (2009.01)

(52) U.S. Cl.
CPC .............. *G06F 21/313* (2013.01); *H04L 9/32* (2013.01); *H04L 9/3273* (2013.01); *H04W 12/06* (2013.01)

(58) Field of Classification Search
CPC ........ G06F 21/313; G06F 21/34; G06F 21/36; G06F 21/42; H04L 9/32; H04L 9/3273; H04L 63/0853; H04L 12/06
See application file for complete search history.

(56) References Cited

U.S. PATENT DOCUMENTS

| | | | | |
|---|---|---|---|---|
| 2006/0156385 A1* | 7/2006 | Chiviendacz | ........... | G06F 21/36 726/2 |
| 2013/0104197 A1* | 4/2013 | Nandakumar | .......... | G06F 21/36 726/4 |
| 2014/0115670 A1* | 4/2014 | Barton | .................. | H04L 9/3228 726/4 |

(Continued)

FOREIGN PATENT DOCUMENTS

| | | |
|---|---|---|
| GB | 2488310 A | 8/2012 |
| GB | 2514419 A | 11/2014 |

OTHER PUBLICATIONS gotification of Transmittal of the International Search Report and the Written Opinion of the International Searching okuthority (Forms PCT/Isa/220, PCT/Isa/210, and PCT/Isa/237) issued on Oct. 12, 2018, in the corresponding International Application No. PCT/EP2018/071941. (13 pp.).

*Primary Examiner* — Chau Le
(74) *Attorney, Agent, or Firm* — Buchanan Ingersoll & Rooney PC

(57) ABSTRACT

Sending from a first user device to a server, through a first channel, a user identifier and a request to get a table. Generating, by the server, a first table including a first character set and being valid. Sending, from the server to the second user device, the first table and a first request to display this latter. Displaying, by or through the second user device, the first table. Selecting, by a user, through the first user device, a character. Sending, from the first user device to the server, through the first channel, the selected charac- (Continued)

ter, as submitted data. Determining, by the server, based upon a reference location within the first table, a corresponding reference character, as reference data. Verifying, by the server, for the user, whether the submitted data does match the reference data. And, if yes, succeeding, by the server, in authenticating the user.

10 Claims, 2 Drawing Sheets

(56) References Cited

U.S. PATENT DOCUMENTS

| | | | |
|---|---|---|---|
| 2015/0295717 A1* | 10/2015 | Brittan | G06F 21/36 713/168 |
| 2016/0127134 A1* | 5/2016 | Goldstone | G06F 21/36 726/7 |
| 2018/0239882 A1* | 8/2018 | Bean | G06F 21/36 |
| 2019/0050618 A1* | 2/2019 | Khuri-Yakub | G06F 3/0436 |

* cited by examiner

METHOD FOR AUTHENTICATING A USER AND CORRESPONDING USER DEVICES, SERVER AND SYSTEM

FIELD OF THE INVENTION

The present invention relates generally to a method for authenticating a user.

Furthermore, the invention pertains to a first and a second user device for authenticating a user.

Moreover, the invention is a server for authenticating a user.

Finally, the invention relates to a system for authenticating a user. The system includes a server and at least two user devices.

The present invention is notably applicable to a field in which a Personal Computer (or PC) is the first user device and a mobile phone is the second user device.

STATE OF THE ART

GB 2 433 147 A describes a solution using a challenge grid filled out with symbols and transmitted from an authenticator to a PC, so as to be presented to the PC user. The user selects, according to a Personal Identification Pattern (or PIP), as locations within the challenge grid, known only to the user and the authenticator, a set of symbols comprised within the challenge grid. Then, the PC sends back the symbol set, so as to be verified by the authenticator and thus authenticate (or not) the user.

However, the challenge grid and the symbol set, as challenge response, have been transmitted through an unsecure communication channel. Such a known solution does not protect from a "Man In The Middle" (or MITM) attack that allows capturing both the challenge grid and the corresponding challenge response to be able to data mine the corresponding selected challenge grid sequence, as user authentication data.

There is a need of an alternative on-line solution for authenticating a user while being more secure than such an aforementioned prior art solution.

SUMMARY OF THE INVENTION

The invention proposes a solution for satisfying the just herein above specified need by providing a method for authenticating a user.

According to the invention, a server accesses an identifier relating to the user associated with an identifier relating to a second user device. The server accesses, for the user, at least one predetermined reference location within a reference table. The method comprises the following steps. Sending from a first user device to the server, through a first communication channel, a first message including the identifier relating to the user and a request to get a challenge table, as challenge user authentication data. Generating, by the server, a first challenge table including a first set of characters, the first challenge table being valid. Sending, thanks to the second user device identifier, from the server to the second user device, through a second communication channel, a second message including the first challenge table and a first request to display the first challenge table. Displaying, by or through the second user device, the first challenge table. Selecting, by a user, through a man machine interface relating to the first user device, at least one corresponding displayed character, as at least one selected character. Sending, from the first user device to the server, through the first communication channel, a third message, as a challenge response message, including the at least one selected character, as submitted user authentication data. Determining, by the server, based upon the at least one predetermined reference location within the first challenge table, as the reference table, at least one corresponding reference character, as reference user authentication data. Verifying, by the server, for the user, whether the submitted user authentication data does or does not match the reference user authentication data. And succeeding, by the server, in authenticating the user only if the submitted user authentication data matches the reference user authentication data. Or failing, by the server, to authenticate the user only if the submitted user authentication data does not match the reference user authentication data.

The principle of the invention consists in using a server to get from an identified first user device (and a client), through a first (communication) channel, a request to get (challenge) user authentication data, such as a (challenge) table. The server registers or lets register a user identifier in association with a corresponding identifier(s), like e.g., a phone number, of a user device, such as a mobile phone. The server also registers or lets register one or several places or locations within a reference table, as a reference PIP and a reference location(s). The server calculates or lets calculate a character set, like e.g., a number(s), an alpha(s) and/or a pictogram(s), as user authentication data, and places or lets place the user authentication data in a (challenge) grid or table, as a series of data items, according to the reference location(s). Then, the server transmits or lets transmit, through a second (communication) channel, to the registered user device (instead of the first user device) the table. The registered user device presents or lets present to its user the received table. The user submits (or selects), through a Man Machine Interface (or MMI) relating to the first user device, one or several characters presented by the second user device. The first user device transmits or lets transmit, through the first channel, to the server the submitted character(s). The server identifies (or determines) from the reference location(s) within the transmitted table, as the reference table, a corresponding reference character set, as reference user authentication data. The server checks whether (or not) the received (submitted) user authentication data matches the reference authentication data. In the affirmative, the server authenticates (successfully) the user. Otherwise, the server does not authenticate the user.

It is to be noted that the invention does not impose any constraint as to the reference user authentication data. The reference user authentication data may include a Personal Identity Number (or a PIN), a password, a One Time Password (or OTP) and/or a user credential(s) that is(are) accessible and identified by the user and the server through the reference location(s).

The user needs to know the reference location(s) within a table to be received by or through the second user device, so as to extract user authentication data comprised or hidden within the table to match the reference user authentication data.

Only the user who has the second user device, as something that the user has and a Factor Authentication (or FA), and who shares with the server the reference location(s), as something that the user knows and another FA, is able to authenticate to the server.

Such a second user device possession allows receiving challenge user authentication data and authenticating successfully the user, through the first user device, to the server.

Each of the first and second user devices may be a standalone entity or may cooperate with another entity(ies), such as an embedded or removable chip(s), as a Secure Element (or SE), to authenticate more securely the concerned user.

Within the present description, an SE is a smart object that includes a chip(s) that protect(s), as a tamper resistant component(s), access to stored data and that is intended to, communicate data with a device(s), like e.g., an SE host device, and/or an SE user.

The invention solution includes a server reception of both a user authentication data request and submitted user authentication data over a first channel, a server transmission of challenge user authentication data over a second channel and a corresponding server authentication.

The user authentication data request and the submitted user authentication data are conveyed over the first channel while the challenge user authentication data is conveyed over the second channel that is separate from the first channel.

Such a use of two channels to communicate the required data to authenticate the concerned user allows enhancing the security of the exchanged data since a potential attacker has to capture data conveyed over the two channels to authenticate fraudulently to the server, as the concerned user.

It is to be noted that the invention does not impose any constraint as to the two used channels. The first channel may be related to an HyperTextTransfer Protocol (or HTTP) (registered trademark) type channel or any other data communication channel. The second channel may be related to an Over-The-Air (or OTA) type channel or any other data communication channel that is distinct from the first channel.

The invention solution constitutes a single flow two FA solution that uses two separate channels.

The invention solution allows removing, with respect to the aforementioned prior art, a need for using a secure channel, so as to exchange secretly data over the single involved channel.

The invention solution allows removing, contrary to the aforementioned prior art, the MITM type attack.

The invention solution is secure, since the user interacts with a first user device to launch a user authentication process, receives, by or through a registered second user device, challenge user authentication data, and sends, by or through the first user device, submitted user authentication data, as a challenge response, to be recognized by the server.

The invention solution allows authenticating securely the user of the first user device and the second user device to be used for receiving necessary challenge user authentication data.

According to an additional aspect, the invention is a first user device for authenticating a user. According to the invention, the first user device is configured to send to a server, through a first communication channel, a message including the identifier relating to the user and a request to get a challenge table, as challenge user authentication data. The first user device is configured to receive, from a user, through a man machine interface relating to the first user device, at least one corresponding character, as at least one selected character. The at least one corresponding character is displayed by or through a second user device. And the first user device is configured to send to the server, through the first communication channel, a challenge response message including the at least one selected character, as submitted user authentication data.

The first user device may be a user terminal, like e.g., a PC or an SE, or any kind of communicating and computing device.

According to still an additional aspect, the invention is a second user device for authenticating a user.

According to the invention, the second user device is configured to receive from a server, through a second communication channel, a message including the first challenge table and a first request to display the first challenge table. And the second user device is configured to display, by or through the second user device, the first challenge table.

The second user device may be a user terminal, like e.g., a mobile phone or an SE, or any kind of communicating and computing device.

According to still an additional aspect, the invention is a server for authenticating a user.

According to the invention, the server comprises means for accessing an identifier relating to the user associated with an identifier relating to a second user device. The server comprises means for accessing, for the user, at least one predetermined reference location within a reference table. The server is configured to receive from a first user device, through a first communication channel, a first message including the identifier relating to the user and a request to get a challenge table, as challenge user authentication data. The server is configured to generate a first challenge table including a first set of characters, the first challenge table being valid. The server is configured to send, thanks to the second user device identifier, to the second user device, through a second communication channel, a second message including the first challenge table and a first request to display the first challenge table. The server is configured to receive, from the first user device, through the first communication channel, a third message, as a challenge response message, including at least one selected character, as submitted user authentication data. The server is configured to determine, based upon the at least one predetermined reference location within the first challenge table, as the reference table, at least one corresponding reference character, as reference user authentication data. The server is configured to verify, for the user, whether the submitted user authentication data does or does not match the reference user authentication data. And the server is configured to succeed in authenticating the user only if the submitted user authentication data matches the reference user authentication data. Or the server is configured to fail to authenticate the user only if the submitted user authentication data does not match the reference user authentication data.

According to still a further aspect, the invention is a system for authenticating a user.

According to the invention, the system includes a server and a first user device and at least one second user device. The server comprises means for accessing an identifier relating to the user associated with an identifier relating to the second user device. The server comprises means for accessing, for the user, at least one predetermined reference location within a reference table. A first user device is configured to send, through a first communication channel, to the server, a first message including the identifier relating to the user and a request to get a challenge table, as challenge user authentication data. The server is configured to generate a first challenge table including a first set of characters, the first challenge table being valid. The server is configured to send, thanks to the second user device identifier, to the second user device, through a second communication channel, a second message including the first challenge table and a first request to display the first challenge table. The second user device is configured to display or let display the first challenge table. The first user device is configured to receive, through a man machine interface relating to the first user device, at least one corresponding displayed character, as at least one selected character. The first user device is configured to send, to the server, through the first communication channel, a third message, as a challenge response message, including the at least one selected character, as submitted user authentication data. The server is configured to determine, based upon the at least one predetermined reference location within the first challenge table, as the reference table, at least one corresponding reference character, as reference user authentication data. The server is configured to verify, for the user, whether the submitted user authentication data does or does not match the reference user authentication data. And the server is configured to succeed in authenticating the user only if the submitted user authentication data matches the reference user authentication data. Or the server is configured to fail to authenticate the user only if the submitted user authentication data does not match the reference user authentication data.

The system may include, at the client side, a PC, as a first user device, and a mobile phone, as a second user device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for authenticating a user is implemented by a PC, as a standalone entity, i.e. without cooperating with another device, such as an SE, and a mobile phone, as a standalone entity, such as an SE.

According to another exemplary embodiment (not represented), the invention method for authenticating a user is implemented by one or two user terminals in cooperation with a respective SE. According to such an embodiment, the SE, as the first or the second user device for authenticating a user, is adapted to perform the functions that are carried out by the PC or the phone respectively and described herein while further providing a secure data processing and preferably a secure data exchange with its host device and/or the server.

The SE may be an incorporated chip, as a chip soldered, possibly in a removable manner, like e.g., an embedded SE, an embedded Universal Integrated Circuit Card (or eUICC) or an integrated Universal Integrated Circuit Card (or iUICC), on a Printed Circuit Board (or PCB) of a host computer device, as an SE host device, or a chip that is coupled to the user terminal, as an SE host device, and included within a Universal Serial Bus (or USB), a smart card or any other medium that may have different form factors. The chip may therefore be fixed to or removable from its host device, like e.g., the PC or the mobile phone.

The invention does not impose any constraint as to a kind of the SE type.

Naturally, the herein below described embodiment is only for exemplifying purposes and is not considered to reduce the scope of the present invention.

Figure 1:
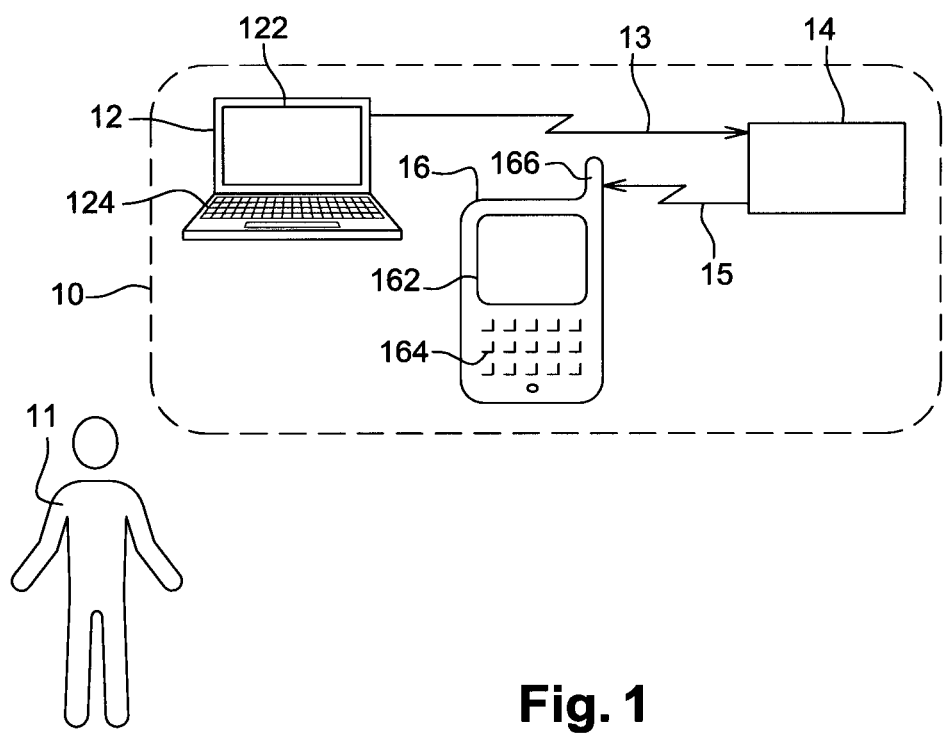
FIG. 1 illustrates a simplified diagram of an exemplary embodiment of a system comprising a PC, a mobile phone and a server, the system using the previously registered phone, to receive at the client side from the server a character set to be displayed by the phone, so that the user submits, through the PC, based on a reference location(s) within the character set, a character subset comprised in the displayed character set, to authenticate to the server, according to the invention.

FIG. 1 shows schematically a system 10 for authenticating a user 11 with a PC 12, as a first user device, a (web) server 14 and a (mobile) phone 16, as a second user device.

Instead of being constituted by a PC, the first user device may be constituted by, e.g., a mobile phone, a smart phone (i.e. a mobile phone with a Personal Digital Assistant (or PDA) capability), a set-top box, a tablet computer, a desktop computer, a laptop computer, a video player, an audio player, a media-player, a game console, a netbook, a PDA or any other computer device connected to or including a Man Machine Interface (or MMI).

The user 11 desires to benefit from one or several services supplied by or through the server 14. The services provided by or through the server 14 may satisfy Word Wide Web Consortium (or W3C) type rules.

The user 11 is registered, as one user account, to the server 14 by using e.g., a user name, as a user 11 identifier(s) (or ID(s)), so as to access one or several services provided by or through the server 14.

During the registration to the server 14, the user 11 may select one or several second user devices that are associated with the (identified) user 11 and to be present and used for being authenticated by or through the server 14.

The phone 16 is thus registered to the server 14 in association with the user 11 ID(s), by using e.g., a Mobile Station International Subscriber Directory Number (or MSISDN), as the phone 16 number, and/or the like, as a phone 16 ID(s), that allow(s) uniquely identifying the phone 16.

For the sake of simplicity, only one PC 12 and one phone 16 for the user 11 has been represented.

However, the server 14 manages a plurality of user accounts and corresponding associated second user devices.

The user 11 uses the PC 12 to connect to the server 14, as a user authentication server.

The PC 12 includes one or several (micro)processor(s) and/or (micro)controller(s) (not represented), as data processing means, one or several memories (not represented), as data storing means, and one or several Input/Output (or I/O) interfaces (not represented).

The PC processor processes data originating from and/or intended to any internal component and data originating from and/or intended to any external device through one or several PC I/O interfaces.

The PC 12 supports a (web type) browser application.

The PC processor executes notably, besides an Operating System (or OS), the browser application.

The browser application may be, as known per se, a Microsoft Internet Explorer (registered trademark), a Mozilla Firefox (registered trademark) application, or any other browser application.

According to an alternative, instead of the browser application, the client is a proprietary application, such as a desktop application, i.e. an application that is typically only accessible by an issuer (or provider) of the considered application.

The browser application plays a role of a client, so as to upload information to the server 14. The browser application may also be used to download information from the server 14.

The PC I/O interface(s) comprise(s) (and/or is connected to) a display screen 122 and a keyboard 124, as an MMI, so as to interact with the PC user 11.

The PC MMI may be used for launching a user authentication process through the client.

The PC I/O interface(s) includes one or several I/O interfaces for exchanging data, via a first communication network (not represented), through a first channel 13 utilizing a wire or wireless link, with the server 14.

Such a first link between the PC 12 and the server 14 is at least mono-directional, i.e. from the PC 12 to the server 14, as an uplink. The first link may be bidirectional.

The PC 12 is adapted to send to the server 14, through a first (communication) channel, a user ID and a request to get user authentication data.

The first channel may be secure or unsecure.

The PC I/O interface with the server 14 may use a HyperText Transfer Protocol (or HTTP), a File Transfer Protocol (or FTP) and/or any other data communication protocol(s), so as to communicate with the server 14.

The PC 12 is arranged to receive, from the user 11, through the PC MMI or an MMI connected to the PC 12, one or several characters that are presented or to be presented by or through the phone 16. The character(s) is(are) selected or submitted by the user 11. The selected character(s) is preferably a subset of the character set presented by or through the phone 16.

The PC 12 is preferably able to get, collect or capture from the user 11 the selected character(s), as submitted user authentication data, like e.g., a PIN(s), a password(s), an OTP(s) and/or a user credential(s).

The PC MMI may be used for presenting information to the PC user 11, like e.g., a message for prompting or requesting the user 11 to select or submit a character(s) that is(are) presented or to be presented to the user 11 by or through the phone 16.

The PC 12 is configured to send to the server 14, through the first channel, the selected character(s), as submitted user authentication data got by or through the PC 12.

The server 14 is connected to the PC 12 over the first channel 13.

The server 14 is remote, i.e. accessible through two or more communication networks, such as an Intranet network and/or an Internet network, allowing to define a first channel 13, and a mobile radio-communication network allowing to define a second channel 15.

The second channel 15 is separate from the first channel 13.

The second channel 15 may be secure or unsecure.

According to an alternative (not represented), the server 14 is local. For example, the server 14 is embedded within a device, such as the PC 12 or an SE that is connected or coupled to the PC 12.

The server 14 is arranged to receive from the PC 12, as a client, through the first channel, a user ID(s), so as to identify the concerned (registered) user 11.

The server 14 is further arranged to receive from the PC 12, as the client, through the first channel 13, for the (identified) user 11, a request to get user authentication data.

The server 14 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The server 14 comprises several I/O interfaces (not represented) for communicating with external devices, such as two user devices 12 and 16, for the concerned user 11, and one or several (micro)processors (not represented), as data processing means, which are internally linked together.

The server 14 comprises and/or is connected to one or several memories (not represented), as a server memory.

The server memory stores a database. The database registers, for each user of a plurality of users, one or several user IDs in association with one or several IDs relating to one or several corresponding communication devices to be present at the client side, as one or several second user devices that the concerned user owns.

The database also registers, for each (identified) user, one or several reference locations within a reference table in association with the user ID(s). The reference location(s) constitute(s) a reference PIP for the concerned user 11, as a formula or secret for extracting a character (or data) set from a reference table. Such a secret is shared with the user 11.

The server memory stores preferably, besides an OS, one or several user authentication application algorithms accessible from the server 14 processor.

Such a user authentication application algorithm allows, when executed by the server 14 processor, generating a first challenge table, as a true, genuine or valid challenge table, including a first set of character(s). The first challenge table constitutes a series of character(s). The first challenge table comprises one or several rows and one or several columns. The first challenge table generated for a user authentication session is preferably distinct from a subsequent challenge table for the same user or a first challenge table generated for another user authentication session. Thus, the first challenge table is valid only for a given session.

The server 14 is further connected to the phone 16 over the second channel 15.

According to an essential invention feature, the server 14, and more exactly the user authentication application algorithm (when executed by the server 14 processor), is configured to send, thanks to the phone 16, as a (registered) second user device, ID(s), to the phone 16, through the second channel 15, the first challenge table and a request to present or display the first challenge table.

The use of the second channel 15 prevents a MitM from intercepting both the challenge and the challenge response data and data mining for the secret shared between the user 11 and the server 14.

The server 14 is adapted to receive, from the PC 12, as a first user device, through the first channel 13, one or several submitted or selected characters, as submitted user authentication data.

The server 14 is also arranged to determine, based on the (predetermined or registered) reference location(s) within the first challenge table, as the reference table, one or several reference characters, as reference user authentication data.

To carry out such a reference user authentication data determination, the server 14 copies (or extracts) each character located within a reference location and concatenates each thus copied character, so as to build or form a subset of one or several characters comprised within the first challenge table.

The server 14 is further configured to check or verify, for the concerned user, whether the submitted user authentication data does or does not match the reference user authentication data.

To carry out such a user authentication data verification, the server 14 compares, for the (identified) user, the (received) submitted user authentication data to the (determined) reference user authentication data.

In the affirmative, i.e. only if the submitted user authentication data matches the reference user authentication data, the server 14 authenticates successfully the concerned user. The server 14 may then send to the first user device, through the first channel 13, and/or to the second user device, through the second channel 15, a corresponding authentication success message(s), such as "Authentication success", as a (comparison or authentication) result.

In the negative, i.e. only if the submitted user authentication data does not match the reference user authentication data, the server 14 fails to authenticate the concerned user. The server 14 may then send to the first user device, through the first channel 13, and/or to the second user device, through the second channel 15, a corresponding authentication failure message(s), such as "Authentication failure", as a result.

The server 14 is connected, through the second channel 15 utilizing a second wire or wireless link, to the phone 16.

Such a second link between the server 14 and the phone 16 is at least mono-directional, i.e. from the server 14 to the phone 16, as a downlink. The second link may be bidirectional.

Instead of being constituted by a phone, the second user device may be constituted by, e.g., a smart phone, a set-top box, a tablet computer, a desktop computer, a laptop computer, a video player, an audio player, a media-player, a game console, a netbook, a PDA or any other computer device connected to or including an MMI.

The second user device may be any other device including means for processing data, comprising or being connected to communication means for receiving or exchanging data with an external device, like e.g., its host device and/or the server 14, and comprising or being connected to means for storing data.

The phone 16 is used for being accessed from the server 14.

The phone 16 includes one or several (micro)processors and/or (micro)controllers (not represented), as means for processing data, comprising and/or being connected to one or several memories, as means for storing data, comprising or being connected to means for interfacing with a user, as MMI, and comprising or being connected to an antenna(s) 166 for exchanging data, through the second channel, with an external device, like e.g., the server 14.

The phone memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

The antenna 166 allows communicating, through a Radio-Frequency (or RF) link(s) 15, as a wireless link(s), via a second (communication) network(s), data with the server 14.

The RF may be fixed at several hundreds of MHz, e.g., around 850, 900, 1800, 1900 and/or 2100 MHz, as Long Range (or LR) type RF.

The phone 16 is configured to receive, from the server 14, through the second channel, a first challenge table and a request to present or display the first challenge table.

The phone MMI is used to present the first challenge table.

The phone MMI includes and/or is connected to a display screen 162.

The display screen 162 allows displaying preferably the first challenge table.

The phone MMI may include and/or be connected to a keyboard 164.

The phone MMI allows the user 11 to interact with the phone 16.

Figure 2:
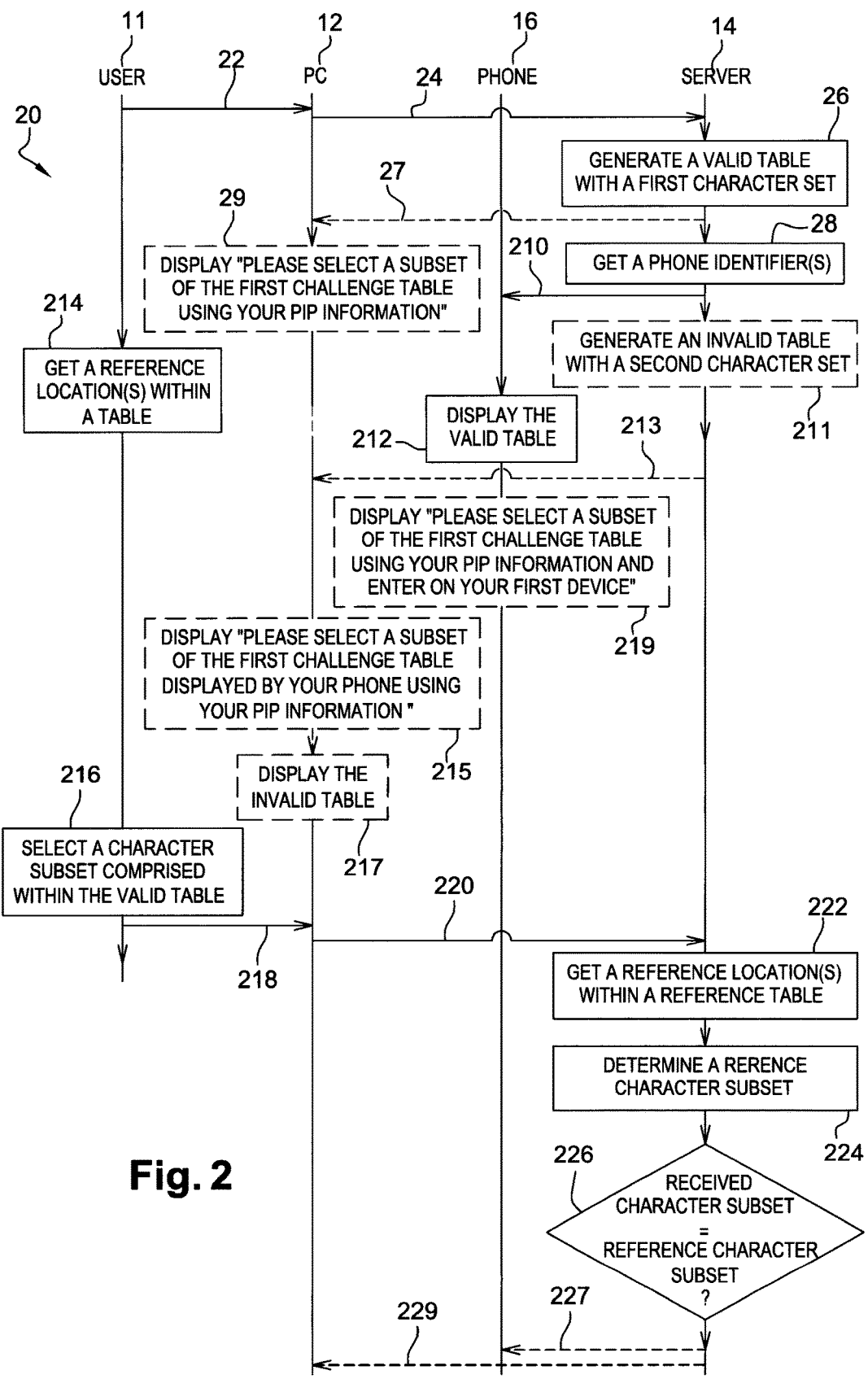
FIG. 2 represents an example of a flow of messages exchanged between the user, the PC, the phone and the server of the system of FIG. 1, so that the server authenticates (or not) securely the user, thanks to a use of the PC and the phone, while using two distinct channels and the reference location(s) shared between only the user and the server.

FIG. 2 depicts an example of a message flow 20 that involves the user 11, the PC 12, the phone 16, and the server 14, so that the server 14 authenticates (or not) the user 11 based on a presence of the phone 16.

It is assumed that the server 14 has previously registered (or let register) (not represented) the user 11 ID in association with the phone 16 number. The phone 16 constitutes a reference user (communication) device to be locally present within the user environment, so as to authenticate the user 11.

To carry out such a device registration in association with an account of the user 11, the server 14 adds preferably the phone 16 further to an explicit user entry or selection, among a set of user communication devices to be locally present to authenticate the user 11.

The user 11 launches 22 an execution of the client supported by the PC 12, so that the user 11 logs in to the server 14.

Alternatively, instead of the user 11, the client is automatically launched (i.e. without any involvement of the user 11).

The PC 12, and more exactly the client, connects to a login portal of the server 14. To do such a connection, the PC 12 transmits to the server 14, through a client channel using e.g., an HTTP type protocol, as a first channel, a message 24 that includes the user ID and a request to get a challenge table, as challenge user authentication data.

The server 14 generates 26 a first challenge table, as a valid challenge table, that includes a first set of characters. Such a first character set generation may be random or pseudo-random.

The first character set is the (true, genuine or) valid character set, as challenge user authentication data.

Such a first character set includes, within one or several predetermined reference locations within the first challenge table, a subset of characters, as reference character subset.

Optionally, the server 14 sends to the PC 12, through the first channel, a message 27 that includes a request to present or display a user request to select one or several characters, as a character subset, that are included within the first challenge table. The PC 12 displays 29 the user request to select a subset of the first challenge table, such as "Please select a subset of the first challenge table using your PIP information".

The server 14 gets or retrieves 28 the phone MSISDN, as a second user device ID(s).

Thanks to the phone MSISDN, the server 14 sends to the phone 16, through e.g., a Short Message Service (or SMS) channel, as a second channel, a message 210 that includes the first challenge table and a request to present or display the first challenge table. The message 210 may include a request to display a user request to select one or several characters included within the first challenge table, such as "Please select a subset of the first challenge table using your PIP information and enter on your first device". The phone 16 displays 219 the user request to select a subset of the first challenge table, such as "Please select a subset of the first challenge table using your PIP information and enter it on your first device".

Optionally, the server 14 generates 211 a second challenge table, as an invalid table, that includes a second set of characters. Such a second character set generation may be random or pseudo-random. The second character set is the (fake or) invalid character set such that the second character set is distinct from the first character set. The server 14 sends to the PC 12, through the first channel, a message 213 that includes the second challenge table and a request to present or display the second challenge table. Such a message 213 may include a request to display a user request to select, as submitted authentication data, through the PC 12, one or several characters comprised within the first challenge table displayed (or presented) or to be displayed (or to be presented) by or through the phone 16. The PC 12 displays 215 the user request to select a subset of the first challenge table, such as "Please select a subset of the first challenge table displayed by your phone using your PIP information". The PC 12 displays 217 the second challenge table including the (invalid) second character set.

Once the phone 16 has received the SMS 210, the phone 16 displays 212 the first challenge table including the (valid) first character set.

The user 11 is thus required to determine, from the first challenge table (got from the phone 16) a character (or data) set, as a challenge response, by using the secret shared with the server 14. The user 11 is further thus required to send, via the PC 12, to the server 14 the challenge response.

The user 11 knows her/his reference PIP and gets 214 one or several reference locations within a challenge table.

The user 11 selects 216, based on the reference locations, one or several characters, as a character subset, within the first and valid challenge table presented or displayed by the phone 16.

To select 216 the character subset, as user authentication data to be submitted, the user 11 enters or types, through the MMI relating or connected to the PC 12, the character subset.

Once the PC 12 has got the selected character subset 218, the PC 12 transmits to the server 14, through the first channel, a challenge response message 220 that includes the selected character subset, as submitted user authentication data.

The server 14 gets 222 the registered reference locations within the first and valid challenge table, as the reference table.

Then, the server 14 determines 224, based on the registered reference locations, one or several characters, as a reference character subset and reference user authentication data, within the reference table presented or displayed by the phone 16.

The server 14 verifies 226 whether the received character subset does or does not match the reference character subset.

In the affirmative, i.e. only if the submitted user authentication data matches the reference user authentication data, the server 14 succeeds in authenticating the user 11 and grants user access to the service(s) managed by or through the server 14.

In the negative, i.e. only if the submitted user authentication data does not match the reference user authentication data, the server 14 fails to authenticate the user 11 and denies user access to the service(s) managed by or through the server 14.

Optionally, the server 14 sends to the phone 16, through the second channel, a message 227 that includes a request to present or display the authentication result. Then, the phone 16 presents or displays or lets display the authentication result (not represented), such as "Authentication failure" or "Authentication success".

Additionally or alternately and still optionally, the server 14 sends to the PC 12, through the first channel, a message 229 that includes a request to present or display the authentication result. Then, the PC 12 presents or displays or lets display the authentication result (not represented), such as "Authentication failure" or "Authentication success".

Only the user 11 who uses the phone 16 that is previously registered at the server 14 side and present at the user location and who knows the reference location(s) within the first challenge table to determine a character(s) comprised within the first challenge table received, by or through the phone 16, i.e. through the second channel, is able to be successfully authenticated to the server 14.

Both the phone 16 and the reference locations are required for a given user to authenticate successfully before or to the server 14.

The invention solution allows carrying out a secure user authentication based on a local presence of the registered second user device that allows receiving challenge user authentication data which the user 11 infers the correct user authentication data from.

The embodiment that has just been described is not intended to limit the scope of the concerned invention. Other embodiments may be given. As another embodiment, instead of using a Long Range RF technology for the second channel, the second user device may communicate through any Short Range RF technology(ies), like e.g., a Wi-Fi, Bluetooth, a Near Field Communication or a Bluetooth Low Energy type technology(ies).

The invention claimed is:

1. A method for authenticating a user, comprising:
sending from a first user device to a server, through a first communication channel, a first message including an identifier relating to the user and a request to get a challenge table, as challenge user authentication data;
generating, by the server, a first challenge table including a first set of characters, the first challenge table being valid;
getting, by the server, an identifier relating to a second user device;
sending, using the second user device identifier, from the server to the second user device, through a second communication channel, a second message including the first challenge table and a first request to display the first challenge table;
displaying, by or through the second user device, the first challenge table;
generating, by the server, a second challenge table including a second set of characters, the second challenge table being invalid;
sending from the server to the first user device, through the first communication channel, a third message including the second challenge table and a second request to display the second challenge table;
displaying, by or through the first user device, the second challenge table;
selecting, by a user, through a man machine interface relating to the first user device, at least one corresponding displayed character, as at least one selected character;

sending, from the first user device to the server, through the first communication channel, a fourth message, as a challenge response message, including the at least one selected character, as submitted user authentication data;

getting, by the server, at least one predetermined reference location within the first challenge table, as the reference table;

determining, by the server, based upon the at least one predetermined reference location within the first challenge table, at least one corresponding reference character, as reference user authentication data;

verifying, by the server, for the user, whether the submitted user authentication data does or does not match the reference user authentication data; and succeeding, by the server, in authenticating the user only if the submitted user authentication data matches the reference user authentication data.

2. The method according to claim 1, wherein the second message further includes a first request to display a user request to select at least one character included within the first challenge table.

3. The method according to claim 1, wherein the server sends to the first user device, through the first communication channel, a fifth message including a first request to display a user request to select at least one character included within the first challenge table.

4. The method according to claim 1, wherein the third message includes a request to display a user request to select, as submitted authentication data, through the first user device, at least one corresponding character comprised within the first challenge table displayed or to be displayed by or through the second user device.

5. The method according to claim 4, wherein the first user device displays the user request to select at least one corresponding character comprised within the first challenge table.

6. The method according to claim 1, wherein the first communication channel is unsecure and the second communication channel is secure.

7. A first user device for authenticating a user,
wherein the first user device is configured to:
send to a server, through a first communication channel, a first message including an identifier relating to the user and a request to get a challenge table, as challenge user authentication data;
receive, from the server, through the first communication channel, a second message including a second challenge table and a second request to display the second challenge table;
display the second challenge table;
receive, from a user, through a man machine interface relating to the first user device, at least one corresponding character, as at least one selected character, the at least one corresponding character being displayed by or through a second user device; and
send to the server, through the first communication channel, a challenge response message including the at least one selected character, as submitted user authentication data.

8. The first user device according to claim 7, wherein, the second message includes a request to display a user request to select, as submitted authentication data, through the first user device, at least one corresponding character comprised within a first challenge table displayed or to be displayed by or through the second user device, the first user device is further configured to display the user request to select at least one corresponding character comprised within the first challenge table.

9. A server for authenticating a user,
wherein, the server is configured to:
receive from a first user device, through a first communication channel, a first message including an identifier relating to the user and a request to get a challenge table, as challenge user authentication data;
generate a first challenge table including a first set of characters, the first challenge table being valid;
get an identifier relating to a second user device;
send, using the second user device identifier, to the second user device, through a second communication channel, a second message including the first challenge table and a first request to display the first challenge table;
generate a second challenge table including a second set of characters, the second challenge table being invalid;
send to the first user device, through the first communication channel, a third message including the second challenge table and a second request to display the second challenge table;
receive, from the first user device, through the first communication channel, a fourth message, as a challenge response message, including at least one selected character, as submitted user authentication data;
get at least one predetermined reference location within the first challenge table, as the reference table;
determine, based upon the at least one predetermined reference location within the first challenge table, at least one corresponding reference character, as reference user authentication data;
verify, for the user, whether the submitted user authentication data does or does not match the reference user authentication data; and
succeed in authenticating the user only if the submitted user authentication data matches the reference user authentication data.

10. A system for authenticating a user,
wherein, the system includes a server and a first user device and at least one second user device,
a first user device is configured to send, through a first communication channel, to the server, a first message including an identifier relating to the user and a request to get a challenge table, as challenge user authentication data
the server is configured to
generate a first challenge table including a first set of characters, the first challenge table being valid;
get an identifier relating to the second user device;
send, using the second user device identifier, to the second user device, through a second communication channel, a second message including the first challenge table and a first request to display the first challenge table;
generate a second challenge table including a second set of characters, the second challenge table being invalid;
send to the first user device, through the first communication channel, a third message including the second challenge table and a second request to display the second challenge table;

the second user device is configured to display or let display the first challenge table;

the first user device is configured to:

display the second challenge table;

receive, through a man machine interface relating to the first user device, at least one corresponding displayed character, as at least one selected character;

send, to the server, through the first communication channel, a fourth message, as a challenge response message, including the at least one selected character, as submitted user authentication data;

the server is configured to:

get at least one predetermined reference location within the first challenge table, as the reference table;

determine, based upon the at least one predetermined reference location within the first challenge table, at least one corresponding reference character, as reference user authentication data;

verify, for the user, whether the submitted user authentication data does or does not match the reference user authentication data; and succeed in authenticating the user only if the submitted user authentication data matches the reference user authentication data.

* * * * *